Oct. 3, 1933.  T. R. HARRISON  1,929,244
CLUTCH MECHANISM
Filed June 18, 1932
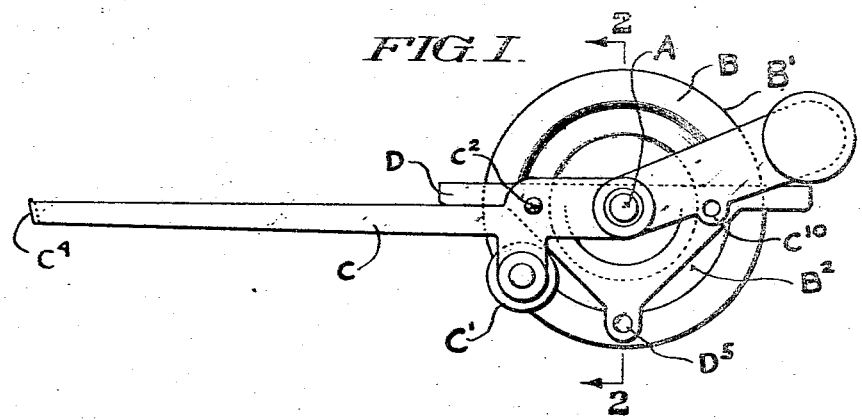
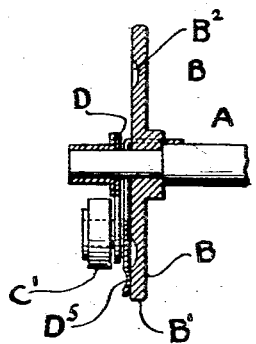
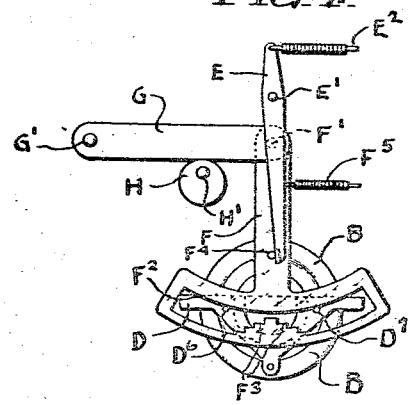
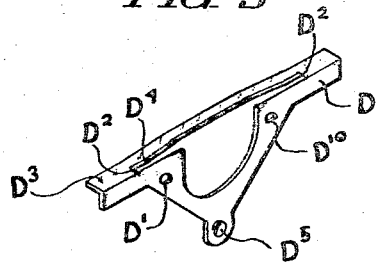
INVENTOR.
Thomas R. Harrison,
BY John E. Hubbell
ATTORNEYS.

Patented Oct. 3, 1933

1,929,244

UNITED STATES PATENT OFFICE 1,929,244

CLUTCH MECHANISM

Thomas R. Harrison, Wyncote, Pa., assignor to The Brown Instrument Company, Philadelphia, Pa., a corporation of Pennsylvania Application June 18, 1932. Serial No. 617,955

17 Claims. (Cl. 74—53)

My present invention consists in an improved clutch mechanism of the type comprising an oscillating driving element and a driven element which is angularly advanced in one direction by movement of the driving element in that direction but does not share in the return movement of the driven element.

The general object of the present invention is to provide an effective clutch mechanism of the type characterized by its simplicity and low inherent cost of manufacture. Further objects of the invention are to provide a clutch mechanism which may be made compact and light in weight and be well adapted for use in measuring and control instruments and for analogous purposes, although the invention is not restricted to such use.

The various features of novelty which characterize my invention are pointed out with particularity in the claims annexed to and forming a part of this specificaiton. For a better understanding of the invention, however, and the advantages possessed by it, reference should be had to the accompanying drawing and descriptive matter in which I have illustrated and described a preferred embodiment of the invention.

Of the drawing:

Fig. 1 is an elevation of a complete clutch mechanism;

Fig. 2 is a section on the line 2—2 of Fig. 1;

Fig. 3 is a perspective view of one member; and

Fig. 4 is an elevation illustrating a modified form of clutch mechanism.

In the embodiment of the invention illustrated in Figs. 1, 2 and 3 of the drawing, the driven element consists of a shaft A and a disc or wheel B secured to the shaft A and having a smooth cylindrical peripheral edge B'. The driving element of the clutch mechanism shown in the drawing is an oscillating lever C journalled on the shaft A. The lever C may be given its movements manually or by any suitable mechanism. As shown the lever C is weighted at its righthand end to give it a gravital tendency to turn in the clockwise direction as seen in Fig. 1, and carries a cam follower roll C' which may be engaged by an actuating cam not shown to give the lever C its return counter-clockwise movements. The lever C is coupled to and gives a turning movement to the driven element on each movement of the lever in the counter-clockwise direction by a clutch member D.

The member D is shown as connected to the lever C by means of a pivot pin $C^2$ carried by the lever C and having a projecting end loosely received in an aperture D' formed for the purpose in the member D. The latter is formed with two parallel shoulders $D^2$ separated by a distance slightly less than the diameter of the disc or wheel B and which extends between and has its peripheral edge in engagement with said shoulders. In the desirable form illustrated, the member D is formed of sheet metal and comprises a body portion parallel to and alongside the disc B, and a flange portion $D^3$ transverse to the plane of the disc B and formed with a slot or opening $D^4$ to receive the wheel C. The shoulders $D^2$ are formed by opposed edge portions of said slot. As shown a portion of the slot $D^4$ adjacent each shoulder $D^2$ has parallel portions at opposite sides of, and in guiding relation with the disc B. Also for the purpose of maintaining the member D in proper relation to the disc B, the body of the member D is formed with a lateral projection $D^5$ adapted to engage the side of the disc B adjacent the periphery of the latter, and at a point on the opposite side of the axis of the shaft A from the line including the shoulders $D^2$. As shown the disc B is formed with a groove $B^2$ at one side to provide suitable clearance for the pivot pin $C^2$.

For the purposes of the present invention the member D must have a bias toward the position in which each of its shoulders $D^2$ or at least the shoulder $D^2$ more remote from the pivot pin $C^2$ bears against the peripheral edge of the disc B. With the parts disposed as shown in the drawing, the bias may be wholly due to gravity.

With the clutch member D and lever C stationary in their generally horizontal position shown in Fig. 1, both shoulders $D^2$ bear against the periphery of the disc B about half of the weight of the member D being transmitted through each shoulder $D^2$ to the disc B. When the lever C is turned in the clockwise direction from the position shown in Fig. 1, the pivot pin $C^2$ takes a portion of the weight of the member D and wholly or largely eliminates pressure between the adjacent shoulder $D^2$ and the edge of the disc B, and the other shoulder $D^2$ then slides along the edge of the disc B and the member D then has no tendency to give movement to the disc B. On the return or counter-clockwise movement of the lever, however, the pivot pin $C^2$ acts on the member D to increase the pressure between each shoulder $D^2$ and the disc B, and, in effect, wedges the latter between the shoulders $D^2$. The member D is thus locked to the disc B and causes the latter to turn with the lever C in the counter-clockwise direction. It will be observed that while the pivot is appreciably closer to one shoulder $D^2$ than to the other, the line of action of the force imparted to the member D by the pin $C^2$ passes between the two shoulders.

By the simple expedient of transferring the pivot pin $C^2$ to the other side of the shaft A from that shown in Fig. 1, as by securing it to the hole $C^{10}$ in the lever C with its end projecting into the hole $D^{10}$ in the member D, the member D can be caused to give clockwise movements to the disc B on corresponding turning movements of the lever C.

As those skilled in the art will readily understand, my improved clutch mechanism is suitable for a wide range of uses, including some in which the torque transmitted by the driving element to the driven element may be relatively large, and some, as in meter instruments in which said torque is quite small. Merely as an illustration of the capacity for instrument use, it is noted that the particular construction illustrated in Figs. 1, 2 and 3 of the drawing was primarily devised for use in an integrating flow meter, wherein the lever C is permitted to periodically turn in the clockwise direction from an initial position into the variable position in which the end $C^4$ of the lever engages an integrator control cam the position of which corresponds to the varying instantaneous value of the flow. In such use, the return or counter-clockwise movement of the lever C into its initial position is effected by a constantly rotating cam engaging the cam follower roll $C'$, and the corresponding counter-clockwise movement imparted to the shaft A is transmitted to a counting train. An integrating flow meter of the character mentioned, employing a clutch mechanism for which the clutch mechanism of the present application might be substituted, is disclosed in my prior application Serial No. 585,212, filed January 7, 1932.

In Fig. 4 I have illustrated a form of my invention adapted to give angular movements varying in direction, and, as shown, varying in magnitude also to the driven element in accordance with the position of a control element. The latter, as shown, is a lever E pivotally supported on a shaft $E'$ and angularly adjusted by mechanism, not shown, which may act on the lever E either through the shaft $E'$ when the lever E is secured to the shaft, or through an operating connection $E^2$. While not restricted to such use, the control element is well adapted for use as a part of a potentiometer instrument, and may be given such movements as are given to the so-called secondary pointer of a type of potentiometer instrument now on the market and in public use in this country which is illustrated and described in the application Serial No. 546,290, filed June 23, 1931, jointly by Ernest H. Grauel, J. Ernest Kessler and myself.

The clutch mechanism shown in Fig. 4 comprises a driven element disc and a clutch member D, which may be identical with the corresponding parts of Figs. 1, 2 and 3, except that the clutch member D of Fig. 4 has two pins $D^6$ and $D^7$ secured in the apertures $D'$ and $D^{10}$, shown in Fig. 3. In Fig. 4, a clutch actuating member F is suspended from a lever G to which it is pivotally connected at $F'$. The lever G is pivotally supported at $G'$ and rests on a wiper cam H rotating about the axis of its supporting shaft $H'$. The rotation of the cam gives rising and falling movements to the member G and thereby to the member F. The latter is formed with a slot $F^2$, through which the pins $D^6$ and $D^7$ extend. The slot $F^2$ is so shaped that when the member F occupies the neutral position shown in Fig. 4, its up and down movements impart no movement to the member D. When the member F is sufficiently displaced from its neutral position in the clockwise direction about its pivot $F'$, the rising movement of the member F will bring one or another of the lefthand group of shoulders $F^3$ formed on the bottom wall of the slot $F^2$ into engagement with the pin $D^6$, and thereby angularly adjust the member D in the clockwise direction without tending to similarly move the disc B. On the return downward movement of the member F, the pin $D^6$ will be engaged by the convex upper wall of the slot $F^2$, and the member D will thereby be returned to the position shown in Fig. 4. On such return movement of the member D, the latter grips the wheel B and gives the latter a counter-clockwise adjustment.

Similarly, when the member F is sufficiently displaced counter-clockwise from the neutral position shown in Fig. 4, the rising movement of the member D will bring one or another of the righthand group of shoulders $F^3$ into engagement with the pin $D^7$, and thus give an idle counter-clockwise adjustment of the member D. On the following down stroke of the member F, the pin $D^7$ will be engaged by the convex upper edge of the slot $F^2$ and the member D thereby returned to its position shown in Fig. 4. Such return movement of the member D will adjust the driven element disc B in the clockwise direction. Owing to the fact that the different shoulders $F^3$ in each group are arranged at different levels, the extent of the angular adjustment given the disc B as a result of the displacement of the member F in either direction from its neutral position will vary in accordance with the extent of displacement.

As shown, the control element E determines the angular position of the member F by virtue of the fact that a pin $F^4$ carried by the member F is held in engagement with one side of the lever E by a spring $F^5$ acting on the member F.

As will be readily apparent to those skilled in the art, the operation of the apparatus shown in Fig. 4 involves a duplication of the operative steps of the arrangement shown in Figs. 1, 2 and 3. With the arrangement of Fig. 4, as with that of Figs. 1, 2 and 3, each actuation of the driven element includes an oscillatory movement of the clutch member in one direction without a corresponding oscillatory movement of the driven element and a return movement of the clutch member, in which the driven element shares. With any particular disposition of the parts shown in Figs. 1, 2 and 3, the initial oscillatory movement of the clutch member is always in one direction, but with the arrangement shown in Fig. 4, the initial oscillatory movement of the clutch member may be in either direction.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. In a clutch mechanism, the combination with a driven element including a rotatable wheel, of a clutch member formed with opposed shoulders separated by a distance less than the diameter of said wheel and between which a portion of the latter extends, said member having a bias toward a position in which one of said shoulders bears against the periphery of said wheel, and means for oscillating said member about the axis of said wheel and acting on said member to force the other of said shoulders into and out of gripping engagement with the periphery of said wheel according as member is moved in one direction or the other.

2. In a clutch mechanism, the combination with a driven element including a rotatable wheel, of a clutch member formed with opposed shoulders separated by a distance somewhat less than the diameter of said wheel and having a bias toward a position in which each of said shoulders bears against the periphery of said wheel, and oscillating means operating on said member when moving in one direction to wedge said wheel between said shoulders and thereby increase the bearing pressure between each shoulder and the wheel, and when moving in the opposite direction to reduce the bearing pressure between one of said shoulders and the wheel.

3. In a clutch mechanism, the combination with a driven element including a rotatable wheel, of a clutch member formed with opposed shoulders separated by a distance somewhat less than the diameter of said wheel and having a bias toward a position in which each of said shoulders bears against the periphery of said wheel and means oscillating about the axis of said wheel and acting on said member along a line intersecting the line connecting said shoulders at a point nearer one of said shoulders than the other whereby when said oscillating means moves in one direction the wheel is wedged between said shoulders and turns with said member, while when said means moves in the opposite direction the bearing pressure between the more closely adjacent shoulder and the wheel is reduced, and the member turns without turning the wheel.

4. In the clutch mechanism, the combination with a driven element including a rotatable wheel, of a clutch member formed with opposed shoulders separated by a distance somewhat less than the diameter of said wheel and having a bias towards the position in which each of said shoulders bears against the periphery of said wheel, a driving member oscillating about the axis of said wheel, and means for pivotally connecting said driving and clutch members optionally either to turn relative to one another about an axis less remote from one than from the other of said shoulders or about an axis less remote from said other shoulder than from said one shoulder.

5. In a clutch mechanism, the combination with a driving element including a rotatable wheel and its supporting shaft, of a clutch member formed with opposed shoulders separated by a distance less than the diameter of said wheel and between which a portion of the latter extends, said member having a bias toward a position in which said shoulders bear against the periphery of said wheel, an oscillating lever journalled on said shaft, and a pivotal connection between said lever and member and less distance from one of said shoulders than from the other.

6. In a clutch mechanism, the combination with a driving element including a rotatable wheel and its supporting shaft, of a clutch member formed with opposed shoulders separated by a distance less than the diameter of said wheel and between which a portion of the latter extends, said member having a bias toward a position in which said shoulders bear against the periphery of said wheel, an oscillating lever journalled on said shaft, and a pivotal connection between said lever and member the axis of which intersects the plane of the wheel within the periphery of the latter and at a lesser distance from one than from the other of said shoulders.

7. In a clutch mechanism, the combination with a driven element including a wheel and its supporting shaft, of a driving member oscillating about the axis of said shaft, and a clutch member pivotally connected to said driving member at a distance from said axis and comprising a sheet metal body alongside said wheel and a transverse flange portion formed with a slot through which said wheel extends with its periphery in engagement with opposed portions of the edge of said slot which are separated from one another by a distance somewhat less than the diameter of said wheel.

8. In a clutch mechanism, the combination with a driven element including a rotatable wheel, of a clutch member formed with opposed shoulders separated by a distance somewhat less than the diameter of said wheel and having a bias toward a position in which each of said shoulders bears against the periphery of said wheel, and operating means adjustable to initially adjust said member angularly in either direction without corresponding adjustment of the wheel and thereafter giving said clutch member a return movement and thereby angularly adjusting said wheel in the direction of said return.

9. In a clutch mechanism, the combination with a driven element including a rotatable wheel, a clutch member formed with opposed shoulders separated by a distance somewhat less than the diameter of said wheel and having a bias toward a position in which each of said shoulders bears against the periphery of said wheel and having engaging parts one adjacent each of said shoulders and operating means adjustable to initially engage one or the other of said engaging parts and reduce the force with which the adjacent shoulder bears against the periphery of the wheel and correspondingly adjust said clutch member angularly in one direction or the other without corresponding adjustment of said wheel, said means thereafter engaging said clutch member to increase said force and return said member to its initial position and thereby adjust said wheel.

10. In a clutch mechanism, the combination with a driven element including a rotatable wheel, of a clutch member formed with opposed shoulders separated by a distance somewhat less than the diameter of said wheel and having a bias toward a position in which each of said shoulders bears against the periphery of said wheel, and an actuating member having a to and fro movement along a path adjustable in either direction from a neutral position of said path, said clutch and actuating members having cooperative parts which engage on movement of said actuating member in one direction when its path is displaced in one or the other direction to thereby reduce the bearing pressure between one or the other of said shoulders and the wheel and effect a corresponding angular adjustment in one direction or the other of said clutch member without effecting a corresponding adjustment of said wheel, said actuating member on its return movement engaging said clutch member to increase the previously reduced bearing pressure and effect a return angular adjustment of said clutch member and thereby effect a corresponding adjustment of said wheel.

11. In a clutch mechanism, the combination with a driven element including a rotatable wheel, of a clutch member formed with opposed shoulders separated by a distance somewhat less than the diameter of said wheel and having a bias toward a position in which each of said shoulders bears against the periphery of said wheel and having lateral projections adjacent each shoulder and an actuating member having a to and fro movement in a direction generally transverse to the line connecting said shoulders, said path being adjustable transversely of its general direction from a neutral position, said actuating member being formed with a slot through which said projections extend shaped to permit movements of said device along the neutral position of said path without operative engagement with said projections but having one side of said slot shaped so that when said path is displaced to one side or the other of its neutral position, on a movement of said device in one direction, said slot side will engage one or the other of said projections and angularly adjust said clutch member in one direction or the other and to an extent dependent on the extent of displacement of said path from its neutral position without effecting a corresponding adjustment of said wheel, and the other side of said wheel, and the other side of said slot being shaped to engage the same projection on the return movement of said device and thereby return the clutch member to its original position and effect a corresponding angular adjustment of said wheel.

12. In a clutch mechanism, the combination with a driven element including a rotatable wheel, of a clutch member formed with opposed shoulders separated by a distance somewhat less than the diameter of said wheel and having a bias toward a position in which each of said shoulders bears against the periphery of said wheel and having lateral projections adjacent each shoulder, and an actuating member having a to and fro movement in a direction generally transverse to the line connecting said shoulders, said path being adjustable transversely of its general direction, from a neutral position, said actuating member being formed with a slot through which said projections extend shaped to permit movements of said device along the neutral position of said path without operative engagement with said projections but having one side of said slot shaped so that when said path is displaced to one side or the other of its neutral position, on movement of the device in one direction, said slot side will engage one or the other of said projections and angularly adjust said clutch member in one direction or the other without effecting a corresponding adjustment of said wheel and the other side of said slot being shaped to engage the previously engaged projection on the return movement of said device and thereby return the clutch member to its original position and effect a corresponding angular adjustment of said wheel, said adjustment being greater or less.

13. In a clutch, a rotatable member having a surface of circular form, a spanner having opposed rigidly connected clutch surfaces adapted to contact said circular surface and separated by a distance less than the diameter of said circular surface and means for rotating said member by applying force to said spanner.

14. In a clutch, a rotatable member having a surface of circular form, a spanner having opposed rigidly connected clutch surfaces adapted to contact said circular surface and separated by a distance less than the diameter of said circular surface and means for rotating said member by applying force to said spanner at a point on the latter such as to impart unequal and opposite torques to said member.

15. In a clutch, a rotatable member having a surface of circular form, a spanner having opposed rigidly connected clutch surfaces adapted to contact said circular surface and separated by a distance less than the diameter of said circular surface and means for rotating said member by applying force to said spanner causing forced contact of said clutch surface on points of said circular surface, imparting to said member unequal and opposite torques at said points of contact.

16. In a clutch, a rotatable member having a surface of circular form, a spanner having opposed rigidly connected clutch surfaces in contact with said circular surface and separated by a distance less than the diameter of said circular surface and means for rotating said member by applying force to said spanner causing one of said clutch surfaces to impart a torque to said member in one direction and causing another of said clutch surfaces to impart a torque to said member in the opposite direction, the resultant torque effecting said rotation.

17. In a clutch, the combination of a member having engaging surfaces non-parallel at points of simultaneous engagement with a spanner and a spanner having opposed rigidly connected clutch surfaces adapted to contact said engaging surfaces.

THOMAS R. HARRISON.